United States Patent
Kim

(10) Patent No.: US 11,937,313 B2
(45) Date of Patent: Mar. 19, 2024

(54) ELECTRONIC DEVICE AND METHOD FOR CONTROLLING BLUETOOTH CONNECTION IN ELECTRONIC DEVICE

(71) Applicant: Samsung Electronics Co., Ltd., Suwon-si (KR)

(72) Inventor: Hyukjoong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 17/298,838

(22) PCT Filed: May 28, 2021

(86) PCT No.: PCT/KR2021/006663
§ 371 (c)(1),
(2) Date: Jun. 1, 2021

(87) PCT Pub. No.: WO2022/035028
PCT Pub. Date: Feb. 17, 2022

(65) Prior Publication Data
US 2022/0322463 A1 Oct. 6, 2022

(30) Foreign Application Priority Data
Aug. 12, 2020 (KR) .......................... 10-2020-0101050

(51) Int. Cl.
*H04W 76/11* (2018.01)
*G06F 3/16* (2006.01)
(52) U.S. Cl.
CPC ............... *H04W 76/11* (2018.02); *G06F 3/16* (2013.01)
(58) Field of Classification Search
CPC .................................. H04W 76/11; G06F 3/16
See application file for complete search history.

(56) References Cited

U.S. PATENT DOCUMENTS

2004/0162027 A1* 8/2004 Chang ............... H04M 1/72412
455/41.2
2007/0140187 A1 6/2007 Rokusek et al.
(Continued)

FOREIGN PATENT DOCUMENTS

KR 10-2013-0106842 A 9/2013
KR 10-2016-0035535 A 3/2016
(Continued)

OTHER PUBLICATIONS

International Search Report dated Sep. 3, 2021, issued in International Patent Application No. PCT/KR2021/006663.

*Primary Examiner* — David Bilodeau
(74) *Attorney, Agent, or Firm* — Jefferson IP Law, LLP

(57) ABSTRACT

An electronic device is provided. The electronic device includes a communication circuit, a memory, and at least one processor operatively connected with the communication circuit and the memory, wherein the memory stores instructions configured to, when executed, enable the at least one processor to obtain a request for a Bluetooth connection between a first Bluetooth peripheral device and a first Bluetooth controller, identify whether the first Bluetooth peripheral device and a second Bluetooth controller are connected with each other based on Bluetooth connection information stored in the memory, control to connect the first Bluetooth peripheral device and the first Bluetooth controller with each other based on whether the first Bluetooth peripheral device and the second Bluetooth controller are connected with each other, and update the Bluetooth connection information based on the connection between the first Bluetooth peripheral device and the first Bluetooth controller.

13 Claims, 10 Drawing Sheets

(56) References Cited

U.S. PATENT DOCUMENTS

| | | |
|---|---|---|
| 2012/0083208 A1 | 4/2012 | Giles et al. |
| 2014/0094124 A1* | 4/2014 | Dave .................. H04W 8/20 |
| | | 455/41.2 |
| 2016/0360345 A1 | 12/2016 | Kim et al. |
| 2017/0289329 A1 | 10/2017 | Yim et al. |
| 2018/0167792 A1* | 6/2018 | Trip .................... H04W 4/80 |
| 2019/0141500 A1* | 5/2019 | Kuenzi ............... H04W 40/30 |
| 2019/0141616 A1* | 5/2019 | Kuenzi ............ H04W 52/0229 |
| 2019/0357023 A1 | 11/2019 | Park |
| 2021/0068194 A1 | 3/2021 | Han et al. |

FOREIGN PATENT DOCUMENTS

| | | |
|---|---|---|
| KR | 10-2019-0084584 A | 7/2019 |
| KR | 10-2019-0134922 A | 12/2019 |

\* cited by examiner

ELECTRONIC DEVICE AND METHOD FOR CONTROLLING BLUETOOTH CONNECTION IN ELECTRONIC DEVICE

CROSS-REFERENCE TO RELATED APPLICATION(S)

This application is a National Phase Entry of PCT International Application number PCT/KR2021/006663, filed on May 28, 2021, which is based on and claimed priority of a Korean patent application number 10-2020-0101050, filed on Aug. 12, 2020, in the Korean Intellectual Property Office the disclosure of which is incorporated by reference herein in its entirety.

TECHNICAL FIELD

The disclosure relates to an electronic device and a method for Bluetooth connection between electronic devices.

BACKGROUND ART

As wireless communication technology advances, an electronic device may communicate with another electronic device via various wireless communication techniques. Bluetooth communication technology means short-range wireless communication technology that may interconnect electronic devices to exchange data or information. Electronic devices may share data at low power using Bluetooth communication technology.

According to a method for connecting electronic devices using Bluetooth communication, when a first device (or a Bluetooth controller) activates the Bluetooth function and transmits a connection request, a second device (or a Bluetooth peripheral device) identifies connection requests transmitted from ambient Bluetooth controllers. The Bluetooth peripheral device may select a Bluetooth controller to which it desires to connect from among the Bluetooth controllers (or paired Bluetooth controllers) that have transmitted the connection requests and communicably connect to the selected Bluetooth controller. Once connected, the Bluetooth controller and the Bluetooth peripheral device each may automatically attempt to connect to the other whenever its power or Bluetooth function is activated.

The above information is presented as background information only to assist with an understanding of the disclosure. No determination has been made, and no assertion is made, as to whether any of the above might be applicable as prior art with regard to the disclosure.

DISCLOSURE

Technical Problem

According to an embodiment, a plurality of Bluetooth controllers (e.g., a television (TV), computer, laptop computer, and smartphone) each may selectively connect to a plurality of Bluetooth peripheral devices (e.g., a speaker, keyboard, and mouse). For example, a Bluetooth peripheral device may be used by a plurality of Bluetooth controllers, and the Bluetooth peripheral device may connect to one of a plurality of Bluetooth controllers and then frequently change its connection to connect to other Bluetooth controllers.

When a Bluetooth peripheral device connected with a first Bluetooth controller changes its connection from the first Bluetooth controller to a second Bluetooth controller, the user performs the operation (command or input) for releasing the connection between the Bluetooth peripheral device and the first Bluetooth controller directly on the first Bluetooth controller and then performs the operation (command or input) for connecting to the Bluetooth peripheral device directly on the second Bluetooth controller. This way is cumbersome. For example, when the user changes the connection between the Bluetooth peripheral device and the first Bluetooth controller to a connection between the Bluetooth peripheral device and the second Bluetooth controller, the user needs to look to the manuals for the first Bluetooth controller and the second Bluetooth controller, which causes inconvenience to the user.

For example, when the user connects a smartphone (Bluetooth controller) with a first Bluetooth speaker (Bluetooth peripheral device) to listen to the sound from the smartphone via the Bluetooth speaker and then desires to use the Bluetooth speaker to output the sound from a TV (second Bluetooth controller), the user releases the connection with the Bluetooth speaker on the smartphone and connects the TV with the Bluetooth speaker. As such, the user needs to take several actions, which may be bothersome.

Aspects of the disclosure are to address at least the above-mentioned problems and/or disadvantages and to provide at least the advantages described below. Accordingly, an aspect of the disclosure is to provide an electronic device that allows the user to change the connection between a Bluetooth controller and a Bluetooth peripheral device by a simple operation and a method for controlling Bluetooth connection on the electronic device.

Another aspect of the disclosure is to provide an electronic device that may automatically establish or release a connection between a Bluetooth controller and the Bluetooth peripheral device only by a simple command (or input) even without the need for the user to manually connect or disconnect the Bluetooth controller and the Bluetooth peripheral device and a method for controlling Bluetooth connection on the electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication circuit, a memory, and at least one processor, wherein the memory stores instructions configured to, when executed, enable the at least one processor to connect with a Bluetooth connection controller through a local network, receive a request requesting a response as to whether the electronic device is capable of Bluetooth communication connection with a Bluetooth peripheral device from the Bluetooth connection controller through the local network, perform a Bluetooth scan to identify whether a connection with the Bluetooth peripheral device is possible, transmit information on whether the connection with the Bluetooth peripheral device is possible to the Bluetooth connection controller, perform a Bluetooth connection with the Bluetooth peripheral device when a request for connection with the Bluetooth peripheral device is received based on the information from the Bluetooth connection controller, and transmit Bluetooth connection information indicating the connection with the Bluetooth peripheral device to the Bluetooth connection controller.

In accordance with another aspect of the disclosure, an electronic device is provided. The electronic device includes a communication circuit, a memory, and at least one processor, wherein the memory stores instructions configured to, when executed, enable the at least one processor to connect with a Bluetooth connection controller through a local network, receive a request requesting a response as to whether the electronic device is capable of Bluetooth communication connection with a Bluetooth peripheral device from the Bluetooth connection controller through the local network, perform a Bluetooth scan to identify whether a connection with the Bluetooth peripheral device is possible, transmit information on whether the connection with the Bluetooth peripheral device is possible to the Bluetooth connection controller, perform a Bluetooth connection with the Bluetooth peripheral device when a request for connection with the Bluetooth peripheral device is received based on the information from the Bluetooth connection controller, and transmit Bluetooth connection information indicating the connection with the Bluetooth peripheral device to the Bluetooth connection controller.

In accordance with another aspect of the disclosure, a method for controlling a Bluetooth connection in an electronic device is provided. The method includes obtaining a request for a Bluetooth connection between a first Bluetooth peripheral device and a first Bluetooth controller, identifying whether the first Bluetooth peripheral device and a second Bluetooth controller are connected with each other based on Bluetooth connection information, controlling to connect the first Bluetooth peripheral device and the first Bluetooth controller with each other based on whether the first Bluetooth peripheral device and the second Bluetooth controller are connected with each other, and updating the Bluetooth connection information based on the connection between the first Bluetooth peripheral device and the first Bluetooth controller.

In accordance with another aspect of the disclosure, a method for forming a Bluetooth connection in an electronic device is provided. The method includes connecting with a Bluetooth connection controller through a local network, receiving a request requesting a response as to whether the electronic device is capable of Bluetooth communication connection with a Bluetooth peripheral device from the Bluetooth connection controller through the local network, performing a Bluetooth scan to identify whether a connection with the Bluetooth peripheral device is possible, transmitting information on whether the connection with the Bluetooth peripheral device is possible to the Bluetooth connection controller, performing a Bluetooth connection with the Bluetooth peripheral device when receiving a request for connection with the Bluetooth peripheral device based on the information from the Bluetooth connection controller, and transmitting Bluetooth connection information indicating the connection with the Bluetooth peripheral device to the Bluetooth connection controller.

According to an embodiment, there is provided a nonvolatile storage medium storing instructions, the instructions configured to be executed by at least one processor to enable the at least one processor to perform at least one operation, the at least one operation comprising obtaining a request for a Bluetooth connection between a first Bluetooth peripheral device and a first Bluetooth controller, identifying whether the first Bluetooth peripheral device and a second Bluetooth controller are connected with each other based on Bluetooth connection information, controlling to connect the first Bluetooth peripheral device and the first Bluetooth controller with each other based on whether the first Bluetooth peripheral device and the second Bluetooth controller are connected with each other, and updating the Bluetooth connection information based on the connection between the first Bluetooth peripheral device and the first Bluetooth controller.

Advantageous Effects

According to an embodiment, it is possible to change a connection between a Bluetooth control device and a Bluetooth peripheral device by a simple operation.

According to an embodiment, it is possible to automatically establish or release a connection between a Bluetooth controller and the Bluetooth peripheral device only by a simple command (or input) even without the need for the user to manually connect or disconnect the Bluetooth controller to/from the Bluetooth peripheral device.

According to an embodiment, the user may automatically connect and disconnect a desired Bluetooth control device and a Bluetooth peripheral device by a single speech input command.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
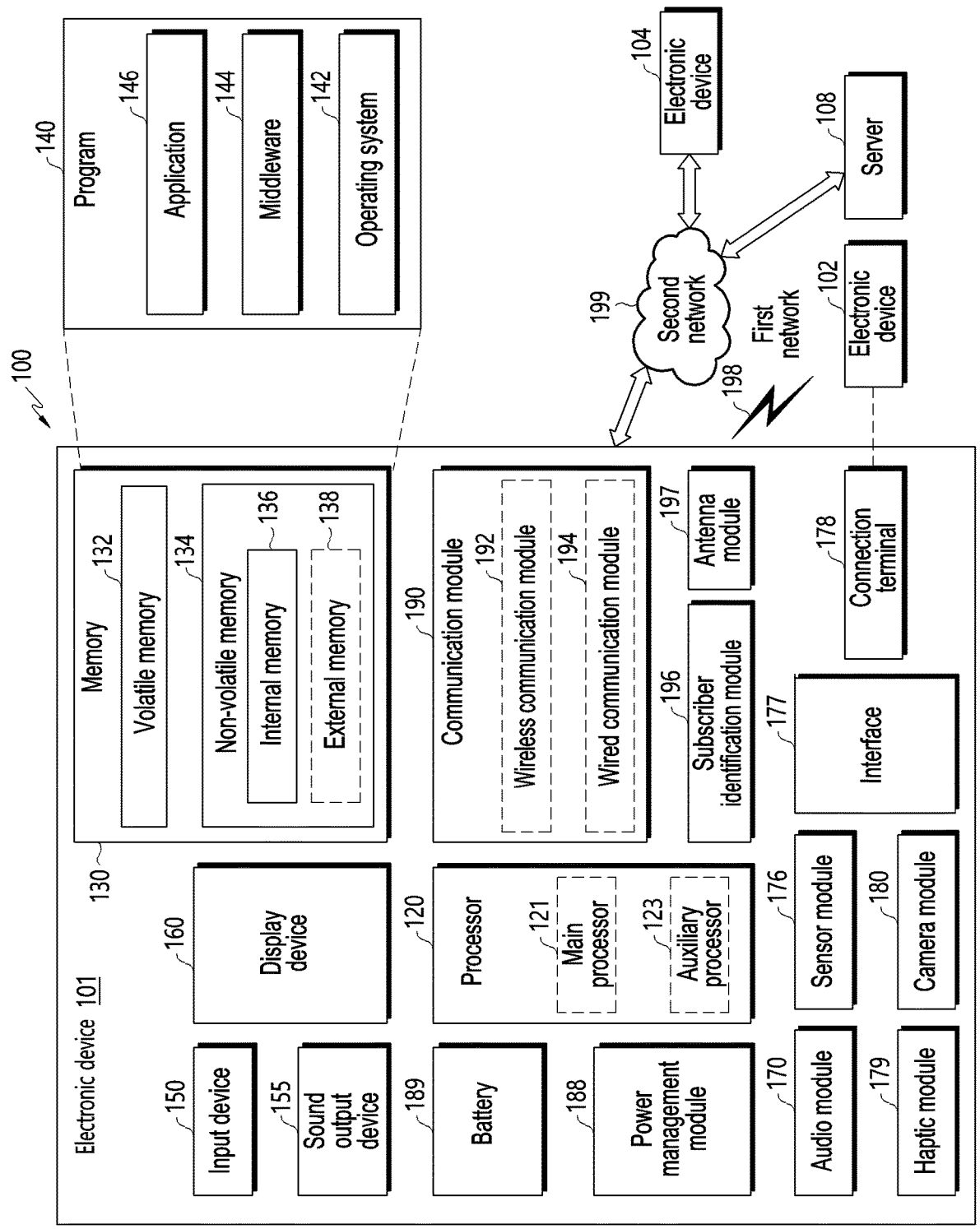
FIG. 1 is a block diagram illustrating an electronic device in a network environment according to an embodiment of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls.

According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™,0 wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
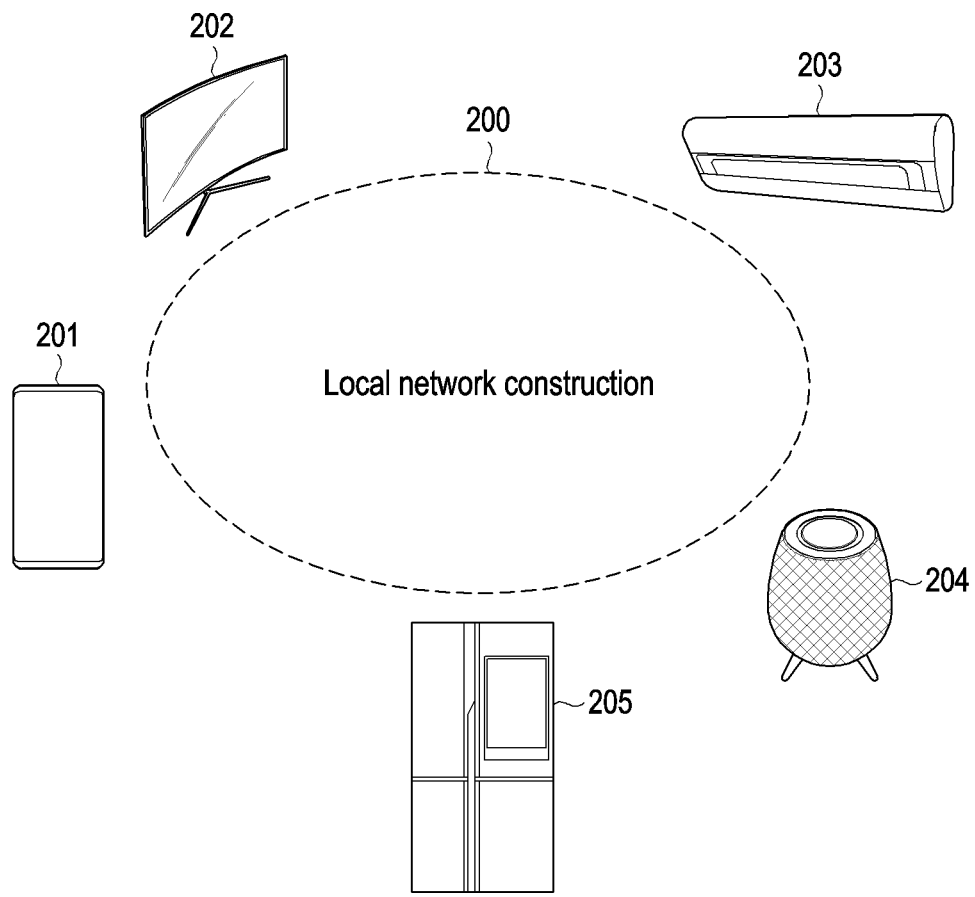
FIG. 2 is a view illustrating a local network between electronic devices according to an embodiment of the disclosure.

FIG. 2 is a view illustrating a network between electronic devices according to an embodiment of the disclosure.

Referring to FIG. 2, a plurality of electronic devices may configure a network. For example, the network may be a local network 200, a cloud network, or another type of network. According to an embodiment, the plurality of electronic devices may include a Bluetooth connection controller (e.g., a connection hub) and a Bluetooth controller, each of which may connect to a Bluetooth peripheral device (not shown). For example, the plurality of electronic devices may include a smartphone 201, a TV 202, an air conditioner 203, a speaker (e.g., an artificial intelligence (AI) speaker) 204, a refrigerator 205, or other various electronic devices. The plurality of electronic devices may include any device that may perform Bluetooth communication, other than the above-described examples.

According to an embodiment, at least one of the plurality of electronic devices may operate as a Bluetooth controller or a Bluetooth connection controller (e.g., a connection hub). Alternatively, at least one of the plurality of electronic devices may operate only as a Bluetooth connection controller (e.g., a connection hub). For example, assuming that the AI speaker 204 among the plurality of electronic devices operates as a Bluetooth connection controller, the Bluetooth connection controller (e.g., the AI speaker 204) may control the Bluetooth connection and disconnection between the other Bluetooth controllers (e.g., the smartphone 201, the TV 202, the air conditioner 203, and the refrigerator 205) and the Bluetooth peripheral device (not shown) via the local network 200.

According to an embodiment, the local network 200 may be a hub-based network, a point to point (P2P) network, or a device to device (D2D)-based network. For example, the plurality of electronic devices may be connected and disconnected from one another through a hub-based network, a P2P network, or a D2D-based network. According to an embodiment, each of the plurality of electronic devices may include (or store) and execute a Bluetooth control application that supports, or is compatible with, a hub-based network, a P2P network, or a D2D-based network. For example, the hub-based network, P2P network, or D2D-based network may be a network that uses various communication schemes, such as a wireless-fidelity (Wi-Fi) communication scheme, Bluetooth communication scheme, wired communication scheme, or mobile communication scheme (e.g., $2^{nd}$ generation (2G), $3^{rd}$ generation (3G), 4G, or 5G).

Figure 3:
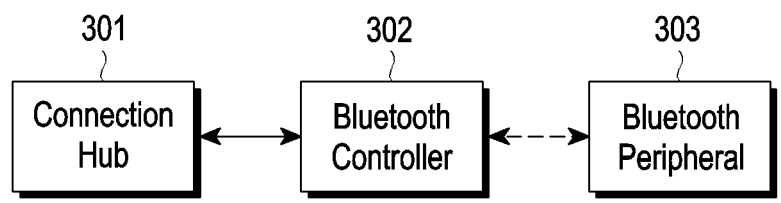
FIG. 3 is a view illustrating a Bluetooth connection controller, a Bluetooth controller, and a Bluetooth peripheral device according to an embodiment of the disclosure.

FIG. 3 is a view illustrating a Bluetooth connection controller, a Bluetooth controller, and a Bluetooth peripheral device according to an embodiment of the disclosure.

Referring to FIG. 3, according to an embodiment, a Bluetooth connection controller (e.g., a connection hub) 301 may connect to a Bluetooth controller 302 via a local network (e.g., a local network 200 of FIG. 2) using a hub-based network, P2P network, or D2D-based network. The Bluetooth controller 302 may be connected to a Bluetooth peripheral device 303 through a Bluetooth communication scheme. According to an embodiment, the Bluetooth connection controller (e.g., the connection hub 301) may control the Bluetooth controller 302 to perform connection and/or disconnection between the Bluetooth controller 302 and the Bluetooth peripheral device 303 and may control to release the Bluetooth connection (e.g., disconnect) between the Bluetooth controller 302 and the Bluetooth peripheral device 303 and to allow the Bluetooth peripheral device 303 to connect to another Bluetooth controller (not shown).

Figure 4:
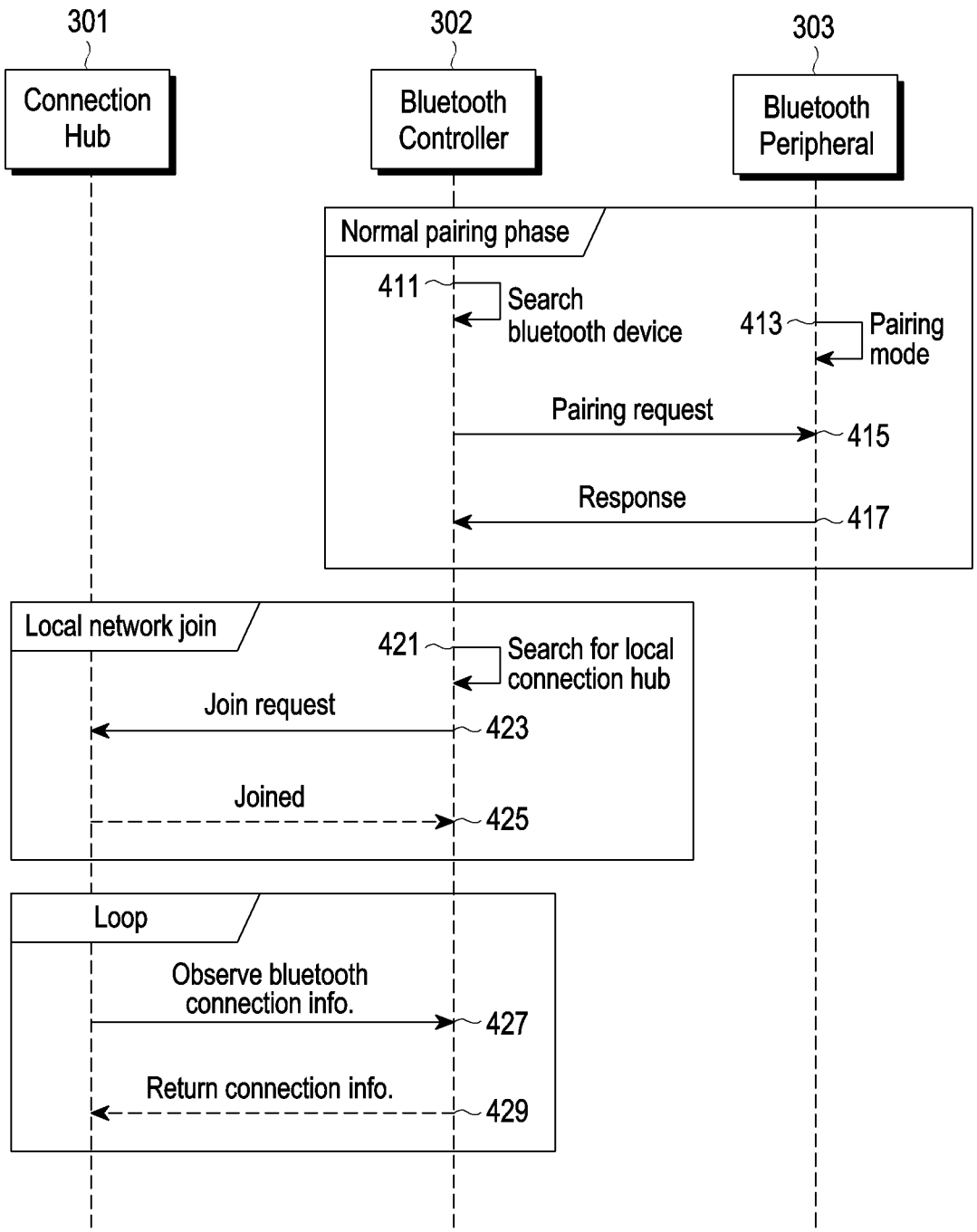
FIG. 4 is a view illustrating an operation for connecting a Bluetooth connection controller, a Bluetooth controller, and a Bluetooth peripheral device according to an embodiment of the disclosure.

FIG. 4 is a view illustrating an operation for connecting a Bluetooth connection controller, a Bluetooth controller, and a Bluetooth peripheral device according to an embodiment of the disclosure.

Referring to FIG. 4, according to an embodiment, a Bluetooth controller 302 may be connected to be able to communicate with a Bluetooth peripheral device 303 while being paired with a Bluetooth peripheral device 303 and be connected with the Bluetooth connection controller (e.g., a connection hub 301) by joining the local network. The pairing and local network joining may be independently performed.

In operation 411, according to an embodiment, the Bluetooth controller 302 may scan a Bluetooth peripheral device (search Bluetooth device).

In operation 413, according to an embodiment, the Bluetooth peripheral device 303 may operate in a pairing mode (pairing mode).

In operation 415, according to an embodiment, the Bluetooth controller 302 may transmit a pairing request to the Bluetooth peripheral device 303 based on the result of scanning and a connection request (pairing request).

In operation 417, according to an embodiment, the Bluetooth peripheral device 303 may transmit a response to the pairing request (response).

According to an embodiment, with the Bluetooth controller 302 and the Bluetooth peripheral device 303 paired with each other based on operations 411, 413, 415, and 417, the Bluetooth controller 302 and the Bluetooth peripheral device 303 may be in a state where they may transmit and receive Bluetooth-based data to/from each other. The Bluetooth controller 302 may join the local network in a state of being paired with the Bluetooth peripheral device 303 (or even before pairing).

In operation 421, according to an embodiment, the Bluetooth controller 302 may search for the Bluetooth connection controller (e.g., the connection hub 301) (search for connection hub).

In operation 423, according to an embodiment, the Bluetooth controller 302 may transmit a join request to the Bluetooth connection controller (e.g., the connection hub 301) (join request). For example, the Bluetooth controller 302 may transmit a local network join request to the Bluetooth connection controller (e.g., the connection hub 301). For example, the local network (e.g., the local network 200 of FIG. 2) may be a hub-based network, a P2P network, or a D2D-based network.

In operation 425, according to an embodiment, the Bluetooth connection controller (e.g., the connection hub 301) may transmit a join permission to the Bluetooth controller 302 (joined).

According to an embodiment, with a local network formed between the Bluetooth controller 302 and the Bluetooth connection controller (e.g., the connection hub 301) based on operations 421, 423, and 425, the Bluetooth controller 302 and the Bluetooth connection controller (e.g., the connection hub 301) may be in a state of being capable of transmitting and receiving local network-based data therebetween.

In operation 427, according to an embodiment, the Bluetooth connection controller (e.g., the connection hub 301) may send a request for Bluetooth connection information to the Bluetooth controller 302 (observe Bluetooth connection information).

In operation 429, according to an embodiment, the Bluetooth controller 302 may provide Bluetooth connection information to the Bluetooth connection controller (e.g., the connection hub 301) (return Bluetooth connection information). According to an embodiment, the Bluetooth connection information may include a list of Bluetooth peripheral devices discovered by the Bluetooth controller 302 (e.g., a list of the identities (Ids) of the discovered Bluetooth peripheral devices), the ID of the Bluetooth peripheral device 303 connected with the Bluetooth controller 302, and category information. The Bluetooth connection information may further include other information related to the Bluetooth peripheral device 303 connected to the Bluetooth controller 302. According to an embodiment, the Bluetooth connection controller (e.g., the connection hub 301) may store the Bluetooth connection information. According to an embodiment, the Bluetooth connection controller (e.g., the connection hub 301) may gather and store the Bluetooth connection information for a plurality of Bluetooth connection controllers (e.g., connection hubs) in the local network in the manner described above.

Figure 5:
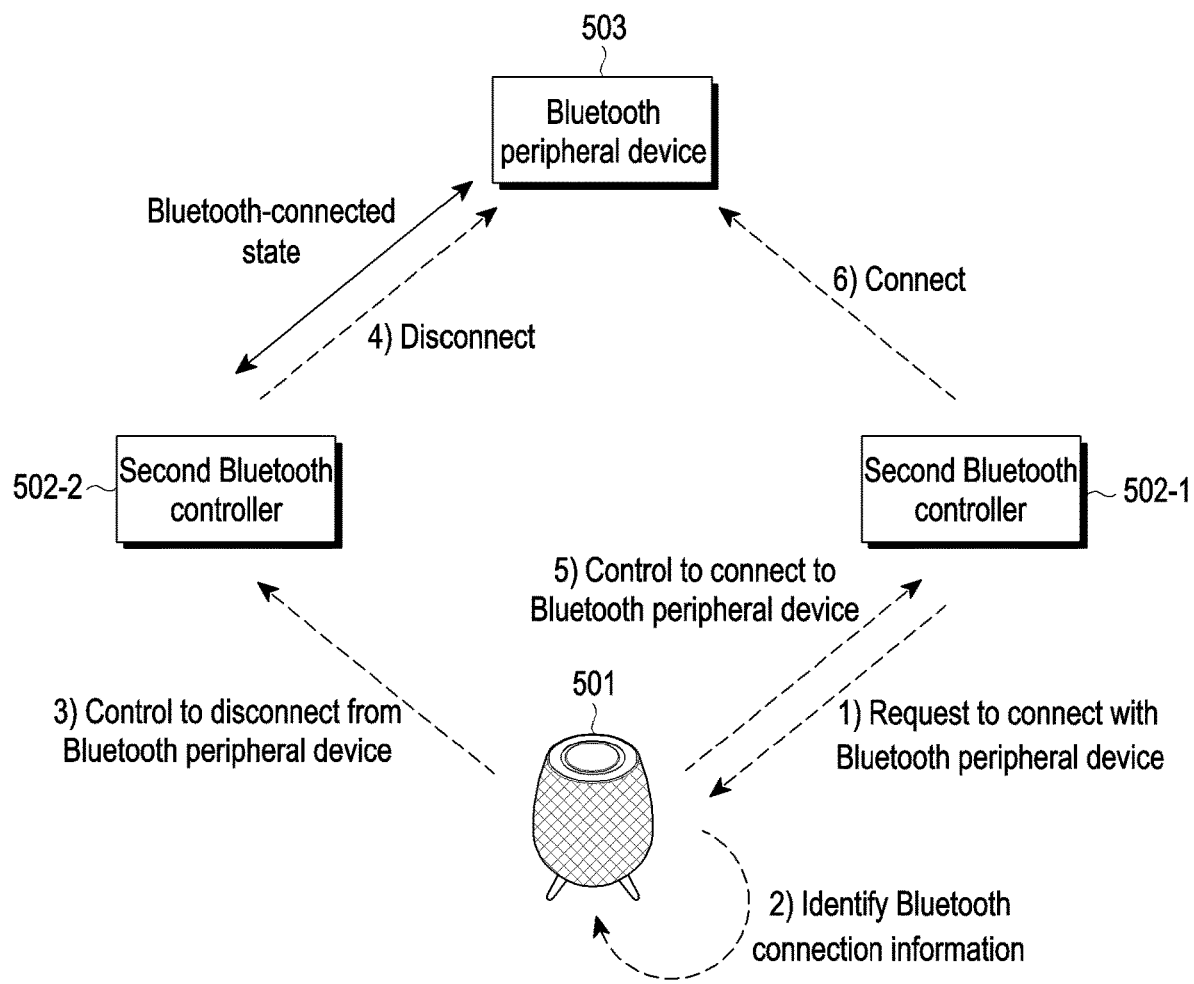
FIG. 5 is a view illustrating a Bluetooth connection controller, a first Bluetooth controller, a second Bluetooth controller, and a Bluetooth peripheral device according to an embodiment of the disclosure.

FIG. 5 is a view illustrating a Bluetooth connection controller, a first Bluetooth controller, a second Bluetooth controller, and a Bluetooth peripheral device according to an embodiment of the disclosure.

Referring to FIG. 5, according to an embodiment, a Bluetooth connection controller 501 (e.g., a connection hub 301 of FIG. 3 or FIG. 4), a first Bluetooth controller 502-1 (e.g., a Bluetooth controller (e.g., TV 202) of FIG. 2, or a Bluetooth controller 302 of FIGS. 3 and 4), and a second Bluetooth controller 502-2 may be in a state of having been joined to a local network. According to an embodiment of the disclosure, the Bluetooth connection controller 501 may store Bluetooth connection information for each of the first Bluetooth controller 502-1 and the second Bluetooth controller 502-2.

According to an embodiment, the Bluetooth connection controller 501 may 1) obtain a request for connection between the first Bluetooth controller 502-1 and a Bluetooth peripheral device 503, with the second Bluetooth controller 502-2 connected with the Bluetooth peripheral device 503 via Bluetooth communication. For example, the Bluetooth connection controller 501 may obtain a request for connection between the first Bluetooth controller 502-1 and the Bluetooth peripheral device 503 by receiving a request for connection with the Bluetooth peripheral device 503 from the first Bluetooth controller 502-1 or based on the user's input (e.g., various user inputs including a speech signal input, a key/button (or touchscreen) input, or a gesture input).

According to an embodiment, the Bluetooth connection controller 501 may 2) identify Bluetooth connection information based on obtaining the request for connection between the first Bluetooth controller 502-1 and the Bluetooth peripheral device 503. For example, the Bluetooth connection controller 501 may identify the Bluetooth connection information, thereby identifying whether each of the first Bluetooth controller 502-1 and the Bluetooth peripheral device 503 is connected to any device via Bluetooth communication or not.

According to an embodiment, the Bluetooth connection controller 501 may 3) control to release the Bluetooth communication connection between the second Bluetooth controller 502-2 and the Bluetooth peripheral device 503 based on identifying the Bluetooth connection information. For example, the Bluetooth connection controller 501 may transmit a signal for releasing the Bluetooth communication connection with the Bluetooth peripheral device 503 to the second Bluetooth controller 502-2.

According to an embodiment, the second Bluetooth controller 502-2 may 4) release the Bluetooth communication connection with the Bluetooth peripheral device 503 based on the control of the Bluetooth connection controller 501. According to an embodiment, the second Bluetooth controller 502-2 may notify the Bluetooth connection controller 501 of the release of the Bluetooth communication connection between the second Bluetooth controller 502-2 and the Bluetooth peripheral device 503, and the Bluetooth connection controller 501 may update the Bluetooth connection information.

According to an embodiment, as the Bluetooth communication connection between the Bluetooth connection controller 501 and the Bluetooth peripheral device 503 is released, the Bluetooth connection controller 501 may 5) control the first Bluetooth controller 502-1 to connect to the Bluetooth peripheral device 503 via Bluetooth communication. For example, the Bluetooth connection controller 501 may transmit a signal for Bluetooth communication connection with the Bluetooth peripheral device 503 to the first Bluetooth controller 502-1.

According to an embodiment, the first Bluetooth controller 502-1 may 6) perform Bluetooth communication connection with the Bluetooth peripheral device 503 based on the control of the Bluetooth connection controller 501. According to an embodiment, the first Bluetooth controller 502-1 may notify the Bluetooth connection controller 501 of Bluetooth communication connection between the first Bluetooth controller 502-1 and the Bluetooth peripheral device 503, and the Bluetooth connection controller 501 may update the Bluetooth connection information.

Figure 6:
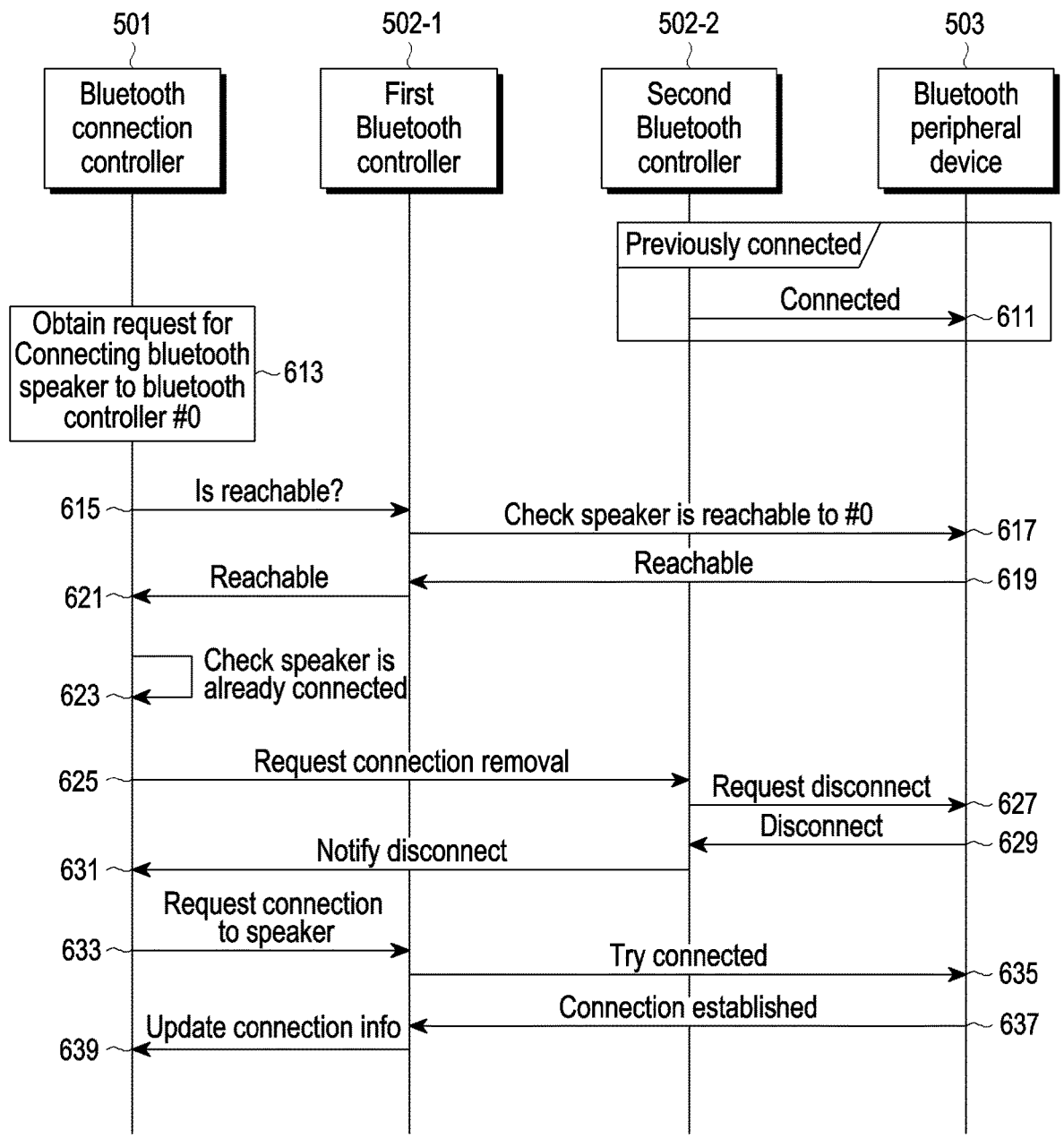
FIG. 6 is a flowchart illustrating operations between a Bluetooth connection controller, a first Bluetooth controller, a second Bluetooth controller, and a Bluetooth peripheral device according to an embodiment of the disclosure.

FIG. 6 is a flowchart illustrating operations between a Bluetooth connection controller, a first Bluetooth controller, a second Bluetooth controller, and a Bluetooth peripheral device according to an embodiment of the disclosure.

Referring to FIG. 6, in operation 611, a second Bluetooth controller 502-2 may be in a state of having been connected to a Bluetooth peripheral device 503. For example, the second Bluetooth controller (e.g., Bluetooth controller #1) 502-2 may be a smartphone, and a Bluetooth peripheral device 503 may be a speaker (e.g., a Bluetooth speaker). The audio data from the smartphone may be transmitted to the speaker and outputted.

In operation 613, according to an embodiment, the Bluetooth connection controller 501 may obtain a request for connection between the first Bluetooth controller 502-1 and the Bluetooth peripheral device 503 (obtain request for connecting Bluetooth speaker to Bluetooth controller #0). For example, the first Bluetooth controller (e.g., Bluetooth controller #0) 502-1 may be a laptop computer. For example, the Bluetooth connection controller 501 may obtain a request for connection between the first Bluetooth controller 502-1 and the Bluetooth peripheral device 503 by receiving a request for connection with the Bluetooth peripheral device 503 from the first Bluetooth controller 502-1 or based on the user's input (e.g., various user inputs including a speech signal input, a key/button (or touchscreen) input, or a gesture input).

In operation 615, according to an embodiment, the Bluetooth connection controller 501 may send a request as to whether the first Bluetooth controller 502-1 may be connected to the Bluetooth peripheral device 503 (is reachable?). For example, the Bluetooth connection controller 501 may send a request as to whether the Bluetooth peripheral device 503 is discovered by the first Bluetooth controller 502-1 via a local network (e.g., the local network 200 of FIG. 2).

In operation 617, according to an embodiment, the first Bluetooth controller 502-1 may identify whether connection with the Bluetooth peripheral device 503 is possible (check speaker is reachable to #0). For example, the first Bluetooth controller 502-1 may identify whether the Bluetooth peripheral device 503 is discovered by performing a Bluetooth communication-based page scan operation.

In operation 619, according to an embodiment, the Bluetooth peripheral device 503 may notify that connection with the first Bluetooth controller 502-1 is possible (reachable). For example, the Bluetooth peripheral device 503 transmits its own ID packet to the Bluetooth peripheral device 503 in response to the Bluetooth communication-based page scan signal, allowing the first Bluetooth controller 502-1 to identify that it may connect thereto.

In operation 621, according to an embodiment, the Bluetooth connection controller 501 may identify that connection between the first Bluetooth controller 502-1 and the Bluetooth peripheral device 503 is possible (reachable). For example, the Bluetooth connection controller 501 may receive a signal or information indicating that connection with the first Bluetooth controller 502-1 and the Bluetooth peripheral device 503 is possible from the first Bluetooth controller 502-1 via the local network (e.g., the local network 200 of FIG. 2).

In operation 623, according to an embodiment, the Bluetooth connection controller 501 may identify the state in which the Bluetooth peripheral device 503 is connected with another Bluetooth controller (e.g., the second Bluetooth controller 502-2) based on previously stored Bluetooth connection information.

In operation 625, according to an embodiment, if the Bluetooth peripheral device 503 is connected with the second Bluetooth controller 502-2, the Bluetooth connection controller 501 may request the second Bluetooth controller 502-2 to release the connection with the Bluetooth peripheral device 503 (request connection removal). For example, the Bluetooth connection controller 501 may transmit a signal for requesting to release the connection with the Bluetooth peripheral device 503 to the second Bluetooth controller 502-2 via the local network (e.g., the local network 200 of FIG. 2). According to an embodiment, after requesting the second Bluetooth controller 502-2 to release the connection with the Bluetooth peripheral device 503, the Bluetooth connection controller 501 may further transmit a signal for preventing other Bluetooth controllers (not shown) than the first Bluetooth controller 502-1 from connecting with the Bluetooth peripheral device 503 to the other Bluetooth controllers (not shown). For example, the other Bluetooth controllers (not shown) than the first Bluetooth controller 502-1 may be other Bluetooth controllers that have been joined to the local network.

In operation 627, according to an embodiment, the second Bluetooth controller 502-2 may transmit a disconnection signal to the Bluetooth peripheral device 503 based on Bluetooth communication (request disconnect).

In operation 629, according to an embodiment, the Bluetooth peripheral device 503 may release the connection with the second Bluetooth controller 502-2 based on Bluetooth communication and transmit a disconnection signal (disconnect).

In operation 631, according to an embodiment, the second Bluetooth controller 502-2 may transmit a signal to notify the Bluetooth connection controller 501 that the connection with the Bluetooth peripheral device 503 has been released via the local network (e.g., the local network 200 of FIG. 2) (notify disconnected). According to an embodiment, the Bluetooth connection controller 501 may update the Bluetooth connection information based on disconnection between the second Bluetooth controller 502-2 and the Bluetooth peripheral device 503.

In operation 633, according to an embodiment, the Bluetooth connection controller 501 may transmit a control signal for requesting to connect with the Bluetooth peripheral device 503 to the first Bluetooth controller 502-1 via the local network (e.g., the local network 200 of FIG. 2) (request connection to speaker).

In operation 635, according to an embodiment, the first Bluetooth controller 502-1 may attempt to connect with the Bluetooth peripheral device 503 based on the request for connection with the Bluetooth peripheral device 503 from the Bluetooth connection controller 501 (try connected).

In operation 637, according to an embodiment, the Bluetooth peripheral device 503 may establish a Bluetooth connection with the first Bluetooth controller 502-1 (connection established).

In operation 639, according to an embodiment, the first Bluetooth controller 502-1 may transmit information indicating that connection with the Bluetooth peripheral device 503 has been established to the Bluetooth connection controller 501 via the local network (update connection information). According to an embodiment, the Bluetooth connection controller 501 may update the Bluetooth connection information based on disconnection between the first Bluetooth controller 502-1 and the Bluetooth peripheral device 503.

Figure 7:
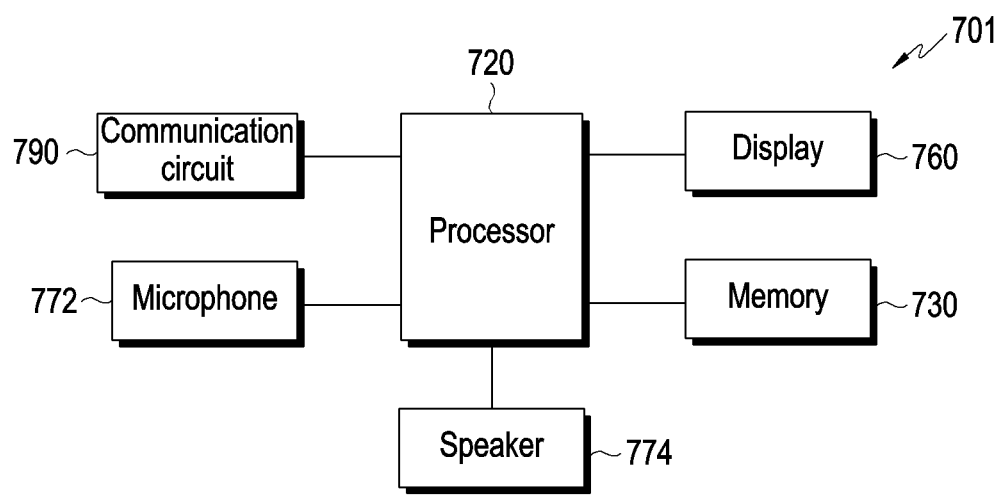
FIG. 7 is a block diagram illustrating a configuration of an electronic device according to an embodiment of the disclosure.

FIG. 7 is a block diagram illustrating a configuration of an electronic device according to an embodiment of the disclosure.

Referring to FIG. 7, according to an embodiment, an electronic device 701 may operate as a Bluetooth connection controller (e.g., the AI speaker 204 of FIG. 2, the connection hub 301 of FIG. 3, or a Bluetooth connection controller 501 of FIG. 5) or operate as a Bluetooth controller (e.g., a Bluetooth controller 302 of FIG. 3, a first Bluetooth controller 502-1 of FIG. 5, or a second Bluetooth controller 502-2 of FIG. 5).

According to an embodiment, the electronic device 701 (e.g., the electronic device 101 of FIG. 1, the connection hub 301 of FIG. 3, or the Bluetooth connection controller 501 of FIG. 5) may include a processor 720, a memory 730, a display 760, a microphone 772, a speaker 774, and/or a communication circuit 790.

According to an embodiment, the communication circuit 790 (e.g., the communication module of FIG. 1) may include a circuit associated with a local network (e.g., the local network of FIG. 2) and may include a Bluetooth communication circuit. The circuit associated with the local network may include a hub-based network, a P2P network, or a D2D-based network. For example, the circuit associated with the local network may include a Wi-Fi communication circuit, a Bluetooth communication circuit, a wired communication circuit, or a mobile communication (2G, 3G, 4G, or 5G) circuit.

According to an embodiment, the processor 720 (e.g., the processor of FIG. 1) may control the electronic device 701 to perform operations corresponding to a Bluetooth connection controller or to perform operations corresponding to a Bluetooth controller.

According to an embodiment, when the electronic device operates as a Bluetooth connection controller, the processor 720 may control the electronic device to form a local network with at least one or more Bluetooth controllers and control to establish or release a Bluetooth connection for at least one or more Bluetooth controllers. For example, upon obtaining a request for connection between a first Bluetooth controller (e.g., the first Bluetooth controller 502-1 of FIG. 5) and a Bluetooth peripheral device (e.g., the Bluetooth peripheral device 503 of FIG. 5), the processor 720 may identify whether the first Bluetooth controller 502-1 and the Bluetooth peripheral device 503 may connect with each other. When the first Bluetooth controller 502-1 and the Bluetooth peripheral device 503 may connect with each other, the processor 720 may identify the state in which the Bluetooth peripheral device 503 is connected with another Bluetooth controller (e.g., the second Bluetooth controller 502-2). If the Bluetooth peripheral device 503 is connected with another Bluetooth controller (e.g., the second Bluetooth controller 502-2), the processor 720 may request the second Bluetooth controller 502-2 to disconnect from the Bluetooth peripheral device 503 and transmit a signal for preventing other Bluetooth controllers (not shown) than the first Bluetooth controller 502-1 from connecting to the Bluetooth peripheral device 503 to the other Bluetooth controllers (not shown). The processor 720 may update the Bluetooth connection information based on the disconnection between the second Bluetooth controller 502-2 and the Bluetooth peripheral device 503 and request the first Bluetooth controller 502-1 to connect with the Bluetooth peripheral device 503. The processor 720 may update the Bluetooth connection information based on receiving the information indicating that a connection with the Bluetooth peripheral device 503 has been established from the first Bluetooth controller 502-1.

According to an embodiment, when the electronic device operates as a Bluetooth controller, the processor 720 may form a local network with the Bluetooth connection controller and connect with or disconnect from the Bluetooth peripheral device. For example, the processor 720 may control to transmit a request for Bluetooth connection with the Bluetooth peripheral device 503 to the Bluetooth connection controller 501. The processor 720 may notify the Bluetooth connection controller 501 that connection with the Bluetooth peripheral device 503 is possible. The processor 720 may control to connect with the Bluetooth peripheral device 503 according to the reception for a control signal for connection with the Bluetooth peripheral device 503 from the Bluetooth connection controller 501 via the local network and control to transmit a signal indicating that a connection with the Bluetooth peripheral device 503 is made to the Bluetooth connection controller 501. As another example, the processor 720 may control to receive a request for disconnection from the Bluetooth peripheral device 503 from the Bluetooth connection controller 501 via the local network, release the Bluetooth connection, and transmit a signal indicating that the Bluetooth connection is released to the Bluetooth connection controller 501.

According to an embodiment, the memory 730 may store instructions and/or data to enable the processor 720 to perform operations. According to an embodiment, the memory 730 may store Bluetooth connection information between at least one Bluetooth controller and at least one Bluetooth peripheral device and/or Bluetooth connection information including disconnection information.

According to an embodiment, the display 760 may display a screen associated with the Bluetooth connection controller 501 or a screen associated with the Bluetooth controller according to the control of the processor 720. For example, the processor 720 may display a screen indicating connection or disconnection between the Bluetooth controller and the Bluetooth peripheral device 503 upon connection or disconnection between the Bluetooth controller and the Bluetooth peripheral device 503 or display a screen to receive the user's confirmation before performing connection or disconnection between the Bluetooth controller and the Bluetooth peripheral device 503.

According to an embodiment, the speaker 774 may output a sound associated with the Bluetooth connection controller 501 or a sound associated with the Bluetooth controller according to the control of the processor 720. For example, upon connection or disconnection between the Bluetooth controller and the Bluetooth peripheral device, the processor 720 may output a sound indicating the connection or disconnection between the Bluetooth controller and the Bluetooth peripheral device or output a sound for receiving the user's confirmation before performing connection or disconnection between the Bluetooth controller and the Bluetooth peripheral device.

According to an embodiment, the microphone 772 may receive an external sound signal. For example, the external sound signal may include a speech signal for requesting connection or disconnection between the Bluetooth controller and the Bluetooth peripheral device.

According to an embodiment, an electronic device (e.g., the electronic device 101 of FIG. 1 or the electronic device 701 of FIG. 7) comprises a communication circuit (e.g., the communication module 190 of FIG. 1 or the communication circuit 790 of FIG. 7), a memory (e.g., the memory 130 of FIG. 1 or the memory 730 of FIG. 7), and at least one processor (e.g., the processor 120 of FIG. 1 or the processor 720 of FIG. 7) operatively connected with the communication circuit and the memory, wherein the memory stores instructions configured to, when executed, enable the at least one processor to obtain a request for a Bluetooth connection between a first Bluetooth peripheral device (e.g., the Bluetooth peripheral device 303 of FIG. 3 or the Bluetooth peripheral device 503 of FIG. 5) and a first Bluetooth controller (e.g., the Bluetooth controller 302 of FIG. 3 or the first Bluetooth controller 502-1 of FIG. 5), identify whether the first Bluetooth peripheral device and a second Bluetooth controller (e.g., the second Bluetooth controller 502-2 of FIG. 5) are connected with each other based on Bluetooth connection information stored in the memory, control to connect the first Bluetooth peripheral device and the first Bluetooth controller with each other based on whether the first Bluetooth peripheral device and the second Bluetooth controller are connected with each other, and update the Bluetooth connection information based on the connection between the first Bluetooth peripheral device and the first Bluetooth controller.

According to an embodiment, the instructions may be executed to enable the at least one processor to, when the first Bluetooth peripheral device is connected with the second Bluetooth controller, control to disconnect the first Bluetooth peripheral device from the second Bluetooth controller and to connect the first Bluetooth peripheral device with the first Bluetooth controller.

According to an embodiment, the instructions may be executed to enable the at least one processor to obtain the request for Bluetooth connection between the first Bluetooth peripheral device and the first Bluetooth controller based on a signal received from the first Bluetooth controller or the first Bluetooth peripheral device through the communication circuit.

According to an embodiment, the electronic device may further comprise a microphone. The instructions may be executed to enable the at least one processor to obtain the request for Bluetooth connection between the first Bluetooth peripheral device and the first Bluetooth controller based on a speech signal received through the microphone.

According to an embodiment, the electronic device may further comprise a transaction. The instructions may be executed to enable the at least one processor to obtain the request for Bluetooth connection between the first Bluetooth peripheral device and the first Bluetooth controller based on an input received through the touchscreen.

According to an embodiment, the communication circuit may include a Bluetooth communication circuit and may further include at least one of a Wi-Fi communication circuit, a wired communication circuit, or a mobile communication circuit.

According to an embodiment, the instructions may be executed to enable the at least one processor to, in response to obtaining the request for Bluetooth connection between the first Bluetooth peripheral device and the first Bluetooth controller, transmit a request requesting a response as to whether a Bluetooth communication connection with the first Bluetooth peripheral device is possible, and receive the response as to whether the Bluetooth communication connection of the first Bluetooth controller is possible from the first Bluetooth controller.

According to an embodiment, an electronic device (e.g., the electronic device 101 of FIG. 1 or the electronic device 701 of FIG. 7) comprises a communication circuit (e.g., the communication module 190 of FIG. 1 or the communication circuit 790 of FIG. 7), a memory (e.g., the memory 130 of FIG. 1 or the memory 730 of FIG. 7), and at least one processor (e.g., the processor 120 of FIG. 1 or the processor 720 of FIG. 7),wherein the memory stores instructions configured to, when executed, enable the at least one processor to connect with a Bluetooth connection controller (e.g., the connection hub 301 of FIG. 3 or the Bluetooth connection controller 501 of FIG. 5) through a local network (e.g., the local network of FIG. 2), receive requesting a response a request as to whether the electronic device is capable of Bluetooth communication connection with a Bluetooth peripheral device (e.g., the Bluetooth peripheral device 303 of FIG. 3 or the Bluetooth peripheral device 503 of FIG. 5) from the Bluetooth connection controller through the local network, perform a Bluetooth scan to identify whether a connection with the Bluetooth peripheral device is possible, transmit information on whether the connection with the Bluetooth peripheral device is possible to the Bluetooth connection controller, perform a Bluetooth connection with the Bluetooth peripheral device when a request for connection with the Bluetooth peripheral device is received based on the information from the Bluetooth connection controller, and transmit Bluetooth connection information indicating the connection with the Bluetooth peripheral device to the Bluetooth connection controller.

According to an embodiment, the instructions may be executed to enable the at least one processor to release the Bluetooth connection with the Bluetooth peripheral device based on receiving a request for disconnection with the Bluetooth peripheral device from the Bluetooth connection controller through the local network, and transmit Bluetooth connection information indicating the disconnection with the Bluetooth peripheral device to the Bluetooth connection controller.

According to an embodiment, a method for controlling a Bluetooth connection in an electronic device (e.g., the electronic device 101 of FIG. 1 or the electronic device 701 of FIG. 7) comprises obtaining a request for a Bluetooth connection between a first Bluetooth peripheral device and a first Bluetooth controller, identifying whether the first Bluetooth peripheral device and a second Bluetooth controller are connected with each other based on Bluetooth connection information, controlling to connect the first Bluetooth peripheral device and the first Bluetooth controller with each other based on whether the first Bluetooth peripheral device and the second Bluetooth controller are connected with each other, and updating the Bluetooth connection information based on the connection between the first Bluetooth peripheral device and the first Bluetooth controller.

According to an embodiment, the method may further comprise, when the first Bluetooth peripheral device is connected with the second Bluetooth controller, controlling to disconnect the first Bluetooth peripheral device from the second Bluetooth controller and to connect the first Bluetooth peripheral device with the first Bluetooth controller.

According to an embodiment, the method may further comprise obtaining the request for Bluetooth connection between the first Bluetooth peripheral device and the first Bluetooth controller based on a signal received from the first Bluetooth controller or the first Bluetooth peripheral device through a communication circuit.

According to an embodiment, the method may further comprise obtaining the request for Bluetooth connection between the first Bluetooth peripheral device and the first Bluetooth controller based on a speech signal received through a microphone.

According to an embodiment, the method may further comprise obtaining the request for Bluetooth connection between the first Bluetooth peripheral device and the first Bluetooth controller based on an input received through a touchscreen.

According to an embodiment, the communication circuit may include a Bluetooth communication circuit and may further include at least one of a Wi-Fi communication circuit, a wired communication circuit, or a mobile communication circuit.

According to an embodiment, the method may further comprise, in response to obtaining the request for Bluetooth connection between the first Bluetooth peripheral device and the first Bluetooth controller, transmitting a request requesting a response as to whether a Bluetooth communication connection with the first Bluetooth peripheral device is possible, and receiving the response as to whether the Bluetooth communication connection of the first Bluetooth controller is possible from the first Bluetooth controller.

According to an embodiment, a method for forming a Bluetooth connection in an electronic device (e.g., the electronic device 101 of FIG. 1 or the electronic device 701 of FIG. 7) comprises connecting with a Bluetooth connection controller through a local network, receiving a request requesting a response as to whether the electronic device is capable of Bluetooth communication connection with a Bluetooth peripheral device from the Bluetooth connection controller through the local network, performing a Bluetooth scan to identify whether a connection with the Bluetooth peripheral device is possible, transmitting information on whether the connection with the Bluetooth peripheral device is possible to the Bluetooth connection controller, performing a Bluetooth connection with the Bluetooth peripheral device based on receiving a request for connection with the Bluetooth peripheral device based on the information from the Bluetooth connection controller, and transmitting Bluetooth connection information indicating the connection with the Bluetooth peripheral device to the Bluetooth connection controller.

According to an embodiment, the method may further comprise performing disconnection with the Bluetooth peripheral device based on receiving a request for the disconnection with the Bluetooth peripheral device from the Bluetooth connection controller through the local network, and transmitting Bluetooth connection information indicating the disconnection from the Bluetooth peripheral device to the Bluetooth connection controller.

Figure 8:
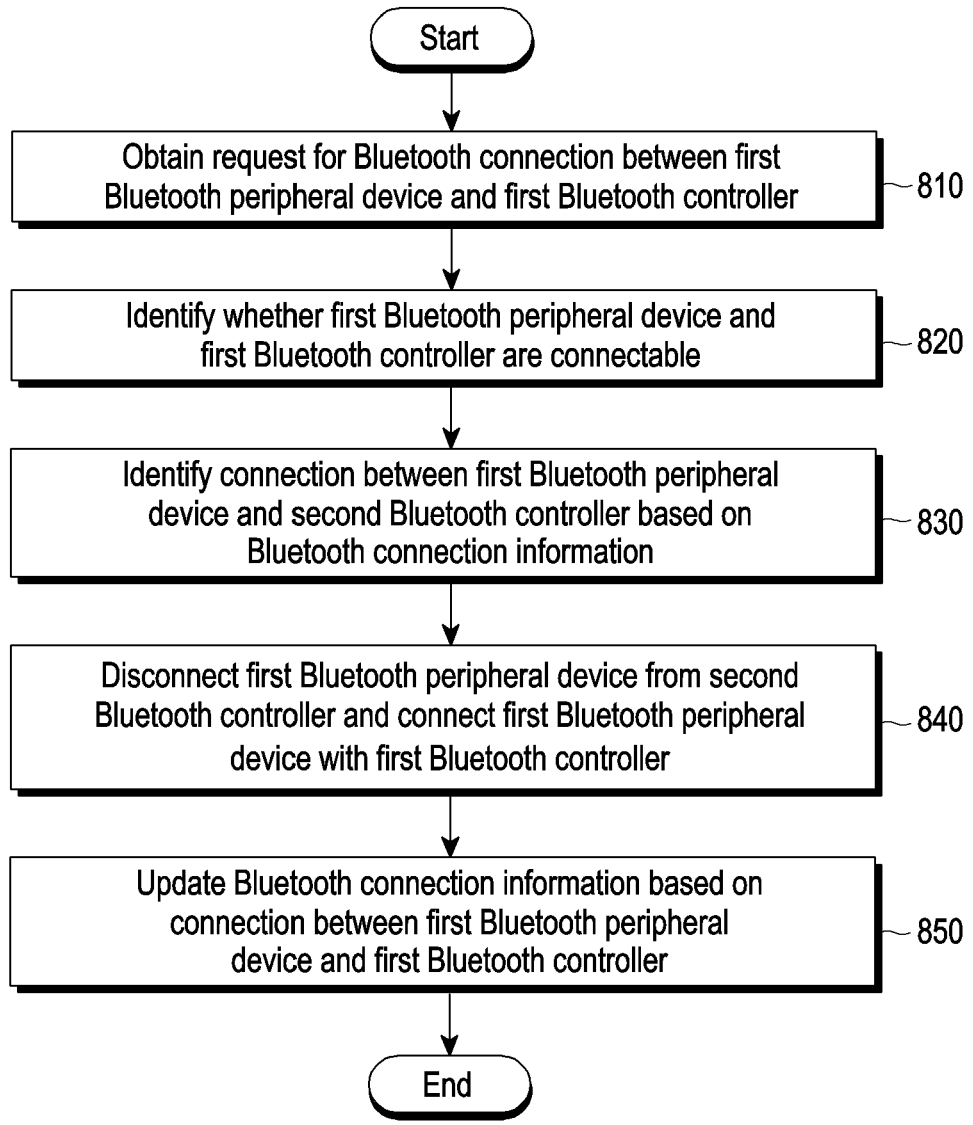
FIG. 8 is a flowchart illustrating a Bluetooth connection control operation in an electronic device according to an embodiment of the disclosure.

FIG. 8 is a flowchart illustrating a Bluetooth connection control operation in an electronic device according to an embodiment of the disclosure.

Referring to FIG. 8, according to an embodiment, a processor (e.g., a processor 120 of FIG. 1 or a processor 720 of FIG. 9) of an electronic device (e.g., a electronic device 101 of FIG. 1 or a electronic device 701 of FIG. 9) may perform at least one of operations 810, 820, 830, 840, and 850.

In operation 810, according to an embodiment, the processor 720 may obtain a request for connection between a first Bluetooth controller (e.g., the first Bluetooth controller 502-1 of FIG. 1) and a Bluetooth peripheral device (e.g., the Bluetooth peripheral device 503 of FIG. 5). For example, the processor 720 may receive an input (e.g., various user inputs including a speech signal input, a key/button (or touchscreen) input, or a gesture input) from the user through the microphone 772, the display 760, or another input module and may obtain a request for connection between the first Bluetooth controller 502-1 and the Bluetooth peripheral device 503 based on the user input. As another example, the processor 720 may receive a request for connection between the first Bluetooth controller 502-1 and the Bluetooth peripheral device 503 from an external device (e.g., the first Bluetooth controller 502-1) through the communication circuit 790.

In operation 820, according to an embodiment, the processor 720 may identify whether the first Bluetooth controller 502-1 and the Bluetooth peripheral device 503 may connect with each other. For example, the processor 720 may identify whether the first Bluetooth controller 502-1 may perform a page scan and ID exchange with the Bluetooth peripheral device 503.

In operation 830, according to an embodiment, the processor 720 may identify whether the Bluetooth peripheral device 503 is connected with another Bluetooth controller (e.g., the second Bluetooth controller 502-2) based on previously stored Bluetooth connection information.

In operation 840, according to an embodiment, if the Bluetooth peripheral device 503 is connected with the second Bluetooth controller 502-2 in the state where the first Bluetooth controller 502-1 and the Bluetooth peripheral device 503 may connect with each other, the processor 720 may control the second Bluetooth controller 502-2 to disconnect from the Bluetooth peripheral device 503 and control the first Bluetooth controller 502-1 to connect to the Bluetooth peripheral device 503.

In operation 850, according to an embodiment, the processor 720 may update the Bluetooth connection information based on the Bluetooth communication connection between the first Bluetooth controller 502-1 and the Bluetooth peripheral device 503.

Figure 9:
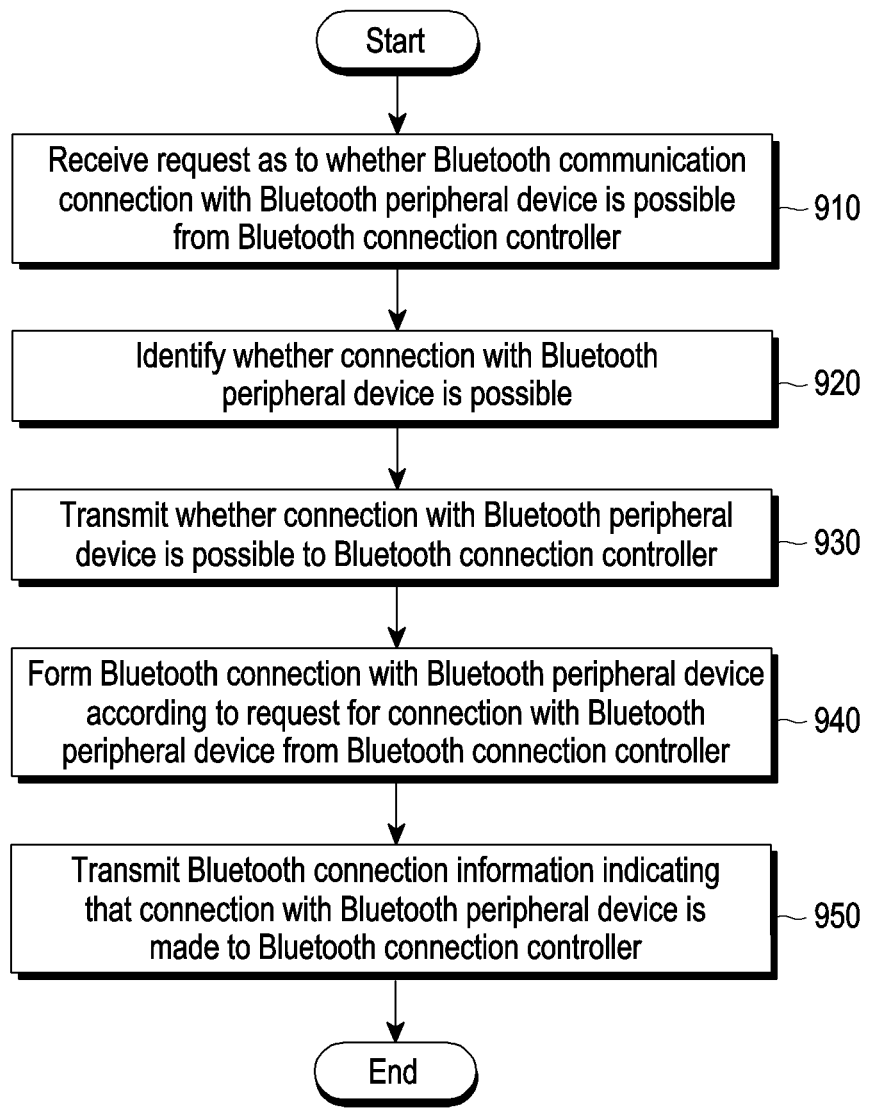
FIG. 9 is a flowchart illustrating an operation for connection with a Bluetooth peripheral device in an electronic device according to an embodiment of the disclosure.

FIG. 9 is a flowchart illustrating an operation for connection with a Bluetooth peripheral device in an electronic device according to an embodiment of the disclosure.

Referring to FIG. 9, according to an embodiment, a processor (e.g., a processor 120 of FIG. 1 or a processor 720 of FIG. 9) of an electronic device (e.g., an electronic device 101 of FIG. 1 or an electronic device 701 of FIG. 9) may perform at least one of operations 910, 920, 930, 940, and 950.

In operation 910, according to an embodiment, the processor 720 may receive a request as to whether connection with a Bluetooth peripheral device (e.g., the Bluetooth peripheral device 503 of FIG. 5) is possible from a Bluetooth connection controller (e.g., the Bluetooth connection controller 501 of FIG. 5) based on a local network through the communication circuit 790.

In operation 920, according to an embodiment, the processor 720 may identify whether connection with the Bluetooth peripheral device 503 is possible based on Bluetooth communication through the communication circuit 790. For example, the processor 720 may perform a Bluetooth communication-based page scan operation, thereby identifying whether an ID packet is received from the Bluetooth peripheral device 503.

In operation 930, according to an embodiment, the processor 720 may transmit a signal or information notifying the Bluetooth connection controller 501 that the electronic device 701 and the Bluetooth peripheral device 503 may connect with each other based on the local network through the communication circuit 790.

In operation 940, according to an embodiment, the processor 720 may perform a Bluetooth communication connection with the Bluetooth peripheral device 503 based on Bluetooth communication through the communication circuit 790 as the control signal for requesting to connect with the Bluetooth peripheral device 503 is received from the Bluetooth connection controller 501 based on the local network through the communication circuit 790.

In operation 950, according to an embodiment, the processor 720 may transmit information notifying the Bluetooth connection controller 501 that a connection with the Bluetooth connection controller 501 has been made based on the local network through the communication circuit 790. Thus, the Bluetooth connection controller 501 may update the Bluetooth connection information.

Figure 10:
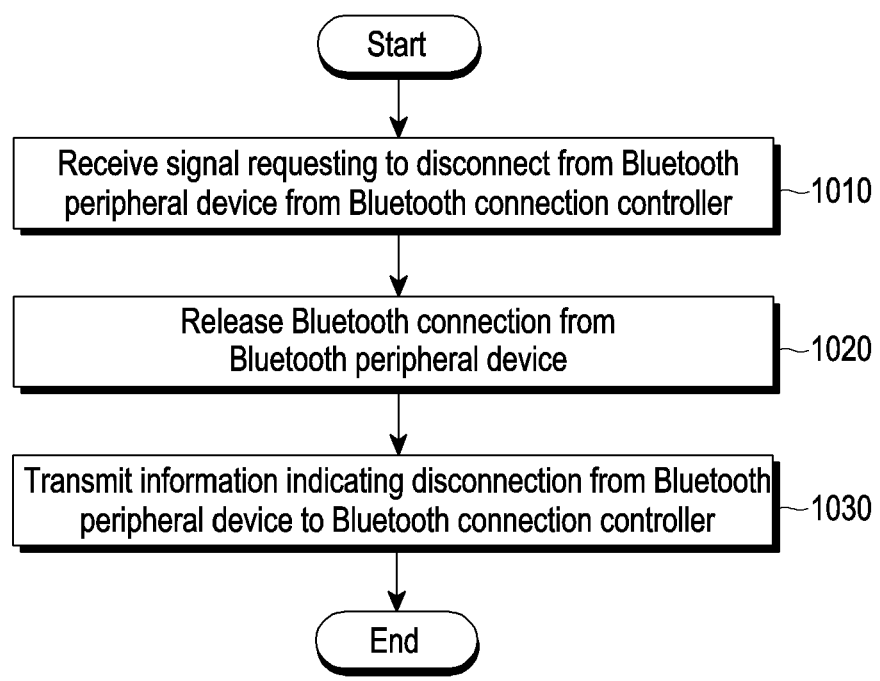
FIG. 10 is a flowchart illustrating an operation for releasing a connection with a Bluetooth peripheral device in an electronic device according to an embodiment of the disclosure.

FIG. 10 is a flowchart illustrating an operation for releasing a connection with a Bluetooth peripheral device in an electronic device according to an embodiment of the disclosure.

Referring to FIG. 10, according to an embodiment, a processor (e.g., a processor 120 of FIG. 1 or a processor 720 of FIG. 9) of an electronic device (e.g., an electronic device 101 of FIG. 1 or an electronic device 701 of FIG. 9) may perform at least one of operations 1010, 1020, and 1030.

In operation 1010, according to an embodiment, the processor 720 may receive a request for releasing the Bluetooth connection with the Bluetooth peripheral device 503 from the Bluetooth connection controller (e.g., the Bluetooth connection controller 501 of FIG. 5) based on the local network through the communication circuit 790 while being connected with the Bluetooth peripheral device (e.g., the Bluetooth peripheral device 503) via Bluetooth communication.

In operation 1020, according to an embodiment, the processor 720 may release the Bluetooth communication connection with the Bluetooth peripheral device (e.g., the Bluetooth peripheral device 503).

In operation 1030, according to an embodiment, the processor 720 may transmit information notifying the Bluetooth connection controller 501 that the Bluetooth communication connection with the Bluetooth peripheral device 503 is released based on the local network through the communication circuit 790. Thus, the Bluetooth connection controller 501 may update the Bluetooth connection information.

Figure 11:
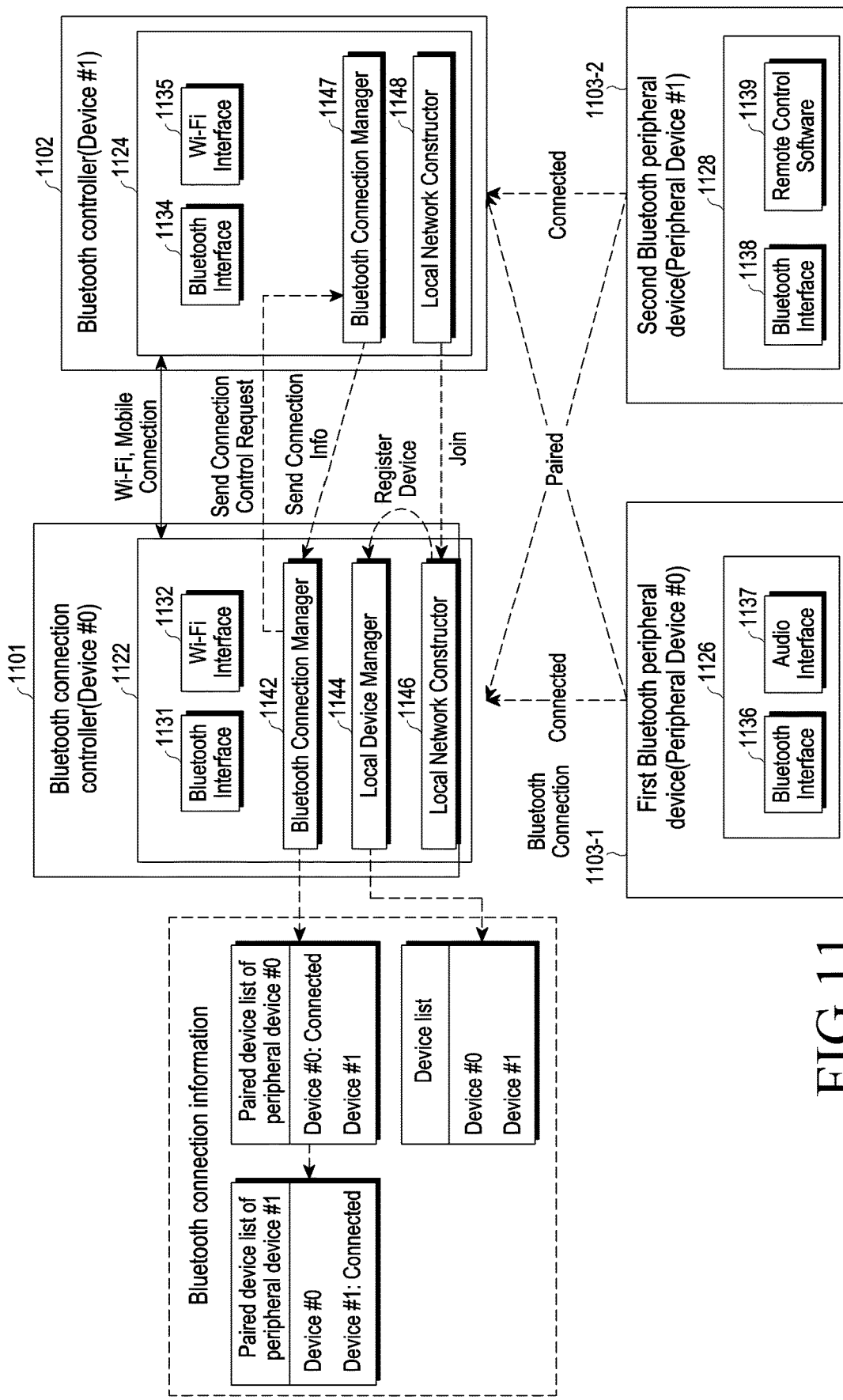
FIG. 11 is a view schematically illustrating operations between a Bluetooth connection controller, a Bluetooth controller, and Bluetooth peripheral devices according to an embodiment of the disclosure.

FIG. 11 is a view schematically illustrating operations between a Bluetooth connection controller, a Bluetooth controller, and Bluetooth peripheral devices according to an embodiment of the disclosure.

Referring to FIG. 11, according to an embodiment, a Bluetooth connection controller (device #0) 1101 (e.g., a connection hub 301 of FIG. 3 or a Bluetooth connection controller 501 of FIG. 5) may include a first application 1122 (or a first application program) to control Bluetooth connection. The first application 1122 may be executed by a processor (e.g., the processor 120 of FIG. 1 or the processor 720 of FIG. 7). According to an embodiment, the first application 1122 may include a Bluetooth interface 1131, a Wi-Fi interface 1132, a Bluetooth connection manager 1142, a local device manager 1144, and a local network constructor 1146. The Bluetooth interface 1131 may perform processing related to Bluetooth communication. The Wi-Fi interface 1132 may perform processing related to Wi-Fi communication. The Bluetooth connection manager 1142 may manage the Bluetooth connection of at least one device joined to a local network and may manage and update Bluetooth connection information. The Bluetooth connection manager 1142 may transmit a connection control request to at least one Bluetooth controller (e.g., a Bluetooth controller (device #1) 1102) (send connection control request). For example, the connection control request may include a disconnection request (e.g., cancel connection to device #1) or a connection request.

The local device manager 1144 may manage a local network connection of at least one device (e.g., at least one Bluetooth controller) joined to the local network. The local network constructor 1146 may perform processing to form a local network with at least one device. According to an embodiment, the local device manager 1144 and the local network constructor 1146 may register the device in the local network (register device).

According to an embodiment, the Bluetooth controller (device #1) 1102 (e.g., the Bluetooth controller 302 of FIG. 3, the first Bluetooth controller 502-1 of FIG. 5, or the second Bluetooth controller 502-2 of FIG. 5) may include a second application 1124 (or a second application program). According to an embodiment, the second application 1124 may be executed by a processor (e.g., the processor 120 of FIG. 1 or the processor 720 of FIG. 7). According to an embodiment, the second application 1124 may include a Bluetooth interface 1134, a Wi-Fi interface 1135, a Bluetooth connection manager 1147, and a local network constructor 1148. The Bluetooth interface 1134 may perform processing related to Bluetooth communication. The Wi-Fi interface 1135 may perform processing related to Wi-Fi communication. The Bluetooth connection manager 1147 may perform processing for pairing or connecting with a Bluetooth peripheral device (e.g., first Bluetooth peripheral device 1103-1 or second Bluetooth peripheral device 1103-2). For example, the Bluetooth connection manager 1147 may transmit Bluetooth connection information (Bluetooth connection info.) to the Bluetooth connection manager 1142 of the Bluetooth connection controller 1101.

The local network constructor 1148 may perform processing to form a local network with at least one device (e.g., the Bluetooth connection controller 1101 or other Bluetooth controllers). For example, the local network constructor 1148 may transmit a join signal to the local network constructor 1146 of the Bluetooth connection controller 1101.

According to an embodiment, a first Bluetooth peripheral device (peripheral device #0) 1103-1 (e.g., the Bluetooth peripheral device 303 of FIG. 3 or the Bluetooth peripheral device 503 of FIG. 5) may include a third application 1126 (or a third application program). According to an embodiment, the third application 1126 may be executed by a processor (not shown). According to an embodiment, the third application 1126 may include a Bluetooth interface 1136 and an audio interface 1137. The Bluetooth interface 1136 may perform processing related to Bluetooth communication. The audio interface 1137 may perform processing related to audio signal processing. For example, the first Bluetooth peripheral device (peripheral device #0) 1103-1 may be a Bluetooth speaker.

According to an embodiment, a second Bluetooth peripheral device (peripheral device #1) 1103-2 (e.g., the Bluetooth peripheral device 303 of FIG. 3 or the Bluetooth peripheral device 503 of FIG. 5) may include a fourth application 1128 (or a fourth application program). According to an embodiment, the fourth application 1128 may be executed by a processor (not shown). According to an embodiment, the fourth application 1128 may include a Bluetooth interface 1138 and remote control software 1139. The Bluetooth interface 1138 may perform processing related to Bluetooth communication. The remote control software 1139 may perform processing associated with remote control signal processing. For example, the second Bluetooth peripheral device (peripheral device #1) 1103-2 may be a Bluetooth remote controller.

According to an embodiment, the Bluetooth connection controller 1101 and the Bluetooth controller 1102 may be connected based on a local network (e.g., a Wi-Fi network or a mobile communication network). According to an embodiment, the Bluetooth connection controller 1101 and the Bluetooth peripheral devices (the first Bluetooth peripheral device 1103-1 and/or the second Bluetooth peripheral device 1103-2) are paired or connected through Bluetooth communication. According to an embodiment, the Bluetooth controller 1102 and the Bluetooth peripheral devices (the first Bluetooth peripheral device 1103-1 and/or the second Bluetooth peripheral device 1103-2) may be paired or connected through Bluetooth communication.

According to an embodiment, the Bluetooth connection information may be stored in a memory (e.g., the memory 130 of FIG. 1 or the memory 730 of FIG. 7) and may include a device list indicating the Bluetooth connection controller (device #0) 1101 and the Bluetooth controller (device #1) 1102. The Bluetooth connection information may include information for a paired device list of the first Bluetooth peripheral device 1103-1 (paired device list of peripheral device #0) and a paired device list of the second Bluetooth peripheral device 1103-2 (paired device list of peripheral device #1).

According to an embodiment, the Bluetooth connection controller 1101 may update the Bluetooth connection information based on a pairing or connection between the Bluetooth connection controller 1101 and Bluetooth peripheral devices or a pairing or connection between the Bluetooth controller 1102 and the Bluetooth peripheral devices and control the Bluetooth connection based on the Bluetooth connection information.

According to an embodiment, the Bluetooth connection controller, the Bluetooth controller, and the Bluetooth peripheral devices may be included in a home Bluetooth connection system. For example, in a case where a home includes family members a, b, c, and d owning mobile phones A, B, C, and D, respectively, Bluetooth controllers including a Home Mini (AI speaker) E, a smart TV F, and a computer (PC) G, and four Bluetooth peripheral devices including a Bluetooth speaker 1, a Bluetooth speaker 2, a Bluetooth selfie stick, and a Bluetooth keyboard, A, B, C, D, E, F, and G each may pair with the four Bluetooth peripheral devices, and the four Bluetooth peripheral devices may connect to one of A, B, C, D, E, F, and G.

For example, in a case where device B sends a request for connection with Bluetooth speaker 1 while device A is connected with Bluetooth speaker 1, connection from device B to Bluetooth speaker 1 may fail or the user needs to disconnect Bluetooth speaker 1 from device A and then connect Bluetooth speaker 1 with device B according to the prior art.

According to an embodiment, at least one (e.g., E) of A, B, C, D, E, F, and G may operate as a Bluetooth connection controller and, when device B requests to connect to Bluetooth speaker 1 while Bluetooth speaker 1 is connected with device A, device E (or another Bluetooth connection controller), instead of the user, may disconnect Bluetooth speaker 1 from device A and connect Bluetooth speaker 1 with device B. In this case, device E (or another Bluetooth connection controller) may control C, D, E, F, and G not to connect to Bluetooth speaker 1 to prevent one of C, D, E, F, and G from connecting to Bluetooth speaker 1 while Bluetooth speaker 1 is disconnected from device A.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138 of the non-volatile memory 134 of FIG. 1)) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, there is provided a non-volatile storage medium storing instructions, the instructions configured to be executed by at least one processor to enable the at least one processor to perform at least one operation, the at least one operation comprising obtaining a request for a Bluetooth connection between a first Bluetooth peripheral device and a first Bluetooth controller, identifying whether the first Bluetooth peripheral device and a second Bluetooth controller are connected with each other based on Bluetooth connection information, controlling to connect the first Bluetooth peripheral device and the first Bluetooth controller with each other based on whether the first Bluetooth peripheral device and the second Bluetooth controller are connected with each other, and updating the Bluetooth connection information based on the connection between the first Bluetooth peripheral device and the first Bluetooth controller.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising:
a communication circuit;
a memory; and
at least one processor operatively connected to the communication circuit and the memory,
wherein the memory stores instructions which, when executed, enable the at least one processor to:
obtain a request for a Bluetooth connection between a first Bluetooth peripheral device and a first Bluetooth controller,
identify whether the first Bluetooth peripheral device and a second Bluetooth controller are connected with each other based on Bluetooth connection information stored in the memory,
in response to the first Bluetooth peripheral device being connected with the second Bluetooth controller, control to disconnect the first Bluetooth peripheral device from the second Bluetooth controller and connect the first Bluetooth peripheral device and the first Bluetooth controller with each other or in response to the first Bluetooth peripheral device being not connected with the second Bluetooth controller, control to connect the first Bluetooth peripheral device and the first Bluetooth controller with each other, and
update the Bluetooth connection information based on the connection between the first Bluetooth peripheral device and the first Bluetooth controller.

2. The electronic device of claim 1, wherein the instructions, when executed, further enable the at least one processor to obtain the request for Bluetooth connection between the first Bluetooth peripheral device and the first Bluetooth controller based on a signal received from the first Bluetooth controller or the first Bluetooth peripheral device through the communication circuit.

3. The electronic device of claim 1, further comprising:
a microphone,
wherein the instructions, when executed, further enable the at least one processor to obtain the request for Bluetooth connection between the first Bluetooth peripheral device and the first Bluetooth controller based on a speech signal received through the microphone.

4. The electronic device of claim 1, further comprising:
a touchscreen,
wherein the instructions, when executed, further enable the at least one processor to obtain the request for Bluetooth connection between the first Bluetooth peripheral device and the first Bluetooth controller based on an input received through the touchscreen.

5. The electronic device of claim 1, wherein the communication circuit comprises a Bluetooth communication circuit and at least one of a Wi-Fi communication circuit, a wired communication circuit, or a mobile communication circuit.

6. The electronic device of claim 1, wherein the instructions, when executed, further enable the at least one processor to:
   in response to obtaining the request for Bluetooth connection between the first Bluetooth peripheral device and the first Bluetooth controller, transmit a request requesting a response as to whether a Bluetooth communication connection with the first Bluetooth peripheral device is possible, and
   receive, from the first Bluetooth controller, the response as to whether the Bluetooth communication connection is possible.

7. A method for controlling a Bluetooth connection in an electronic device, the method comprising:
   obtaining a request for a Bluetooth connection between a first Bluetooth peripheral device and a first Bluetooth controller;
   identifying whether the first Bluetooth peripheral device and a second Bluetooth controller are connected with each other based on Bluetooth connection information;
   in response to the first Bluetooth peripheral device being connected with the second Bluetooth controller, disconnecting the first Bluetooth peripheral device from the second Bluetooth controller and connecting the first Bluetooth peripheral device and the first Bluetooth controller with each other or in response to the first Bluetooth peripheral device being not connected with the second Bluetooth controller, connecting the first Bluetooth peripheral device and the first Bluetooth controller with each other; and
   updating the Bluetooth connection information based on the connection between the first Bluetooth peripheral device and the first Bluetooth controller.

8. The method of claim 7, further comprising obtaining the request for Bluetooth connection between the first Bluetooth peripheral device and the first Bluetooth controller based on a signal received from the first Bluetooth controller or the first Bluetooth peripheral device through a communication circuit of the electronic device.

9. The method of claim 8, wherein the communication circuit comprises a Bluetooth communication circuit and at least one of a Wi-Fi communication circuit, a wired communication circuit, or a mobile communication circuit.

10. The method of claim 7, further comprising:
   in response to obtaining the request for Bluetooth connection between the first Bluetooth peripheral device and the first Bluetooth controller, transmitting a request requesting a response as to whether a Bluetooth communication connection with the first Bluetooth peripheral device is possible; and
   receiving, from the first Bluetooth controller, the response as to whether the Bluetooth communication connection is possible.

11. A non-volatile and non-transitory storage medium storing instructions which, when executed by at least one processor, enable the at least one processor to perform at least one operation, the at least one operation comprising:
   obtaining a request for a Bluetooth connection between a first Bluetooth peripheral device and a first Bluetooth controller;
   identifying whether the first Bluetooth peripheral device and a second Bluetooth controller are connected with each other based on Bluetooth connection information;
   in response to the first Bluetooth peripheral device being connected with the second Bluetooth controller, disconnecting the first Bluetooth peripheral device from the second Bluetooth controller and connecting the first Bluetooth peripheral device and the first Bluetooth controller with each other or in response to the first Bluetooth peripheral device being not connected with the second Bluetooth controller, connecting the first Bluetooth peripheral device and the first Bluetooth controller with each other; and
   updating the Bluetooth connection information based on the connection between the first Bluetooth peripheral device and the first Bluetooth controller.

12. The method of claim 7, further comprising obtaining the request for Bluetooth connection between the first Bluetooth peripheral device and the first Bluetooth controller based on a speech signal received through a microphone of the electronic device.

13. The method of claim 7, further comprising obtaining the request for Bluetooth connection between the first Bluetooth peripheral device and the first Bluetooth controller based on an input received through a touchscreen of the electronic device.

* * * * *